United States Patent [19]

Huntley

[11] 4,039,952
[45] Aug. 2, 1977

[54] DIGITAL FREQUENCY SHIFT-KEYED TRANSMITTER

[75] Inventor: Christopher R. Huntley, Burnaby, Canada

[73] Assignee: GTE Lenkurt Electric (Canada) Ltd., Burnaby, Canada

[21] Appl. No.: 566,876

[22] Filed: Apr. 10, 1975

[30] Foreign Application Priority Data

May 9, 1974 Canada .................................. 199594

[51] Int. Cl.$^2$ .............................................. H04B 1/04
[52] U.S. Cl. ...................................... 325/163; 328/59; 331/179
[58] Field of Search ...................... 178/66 R, 66 A, 68; 325/163, 161, 320; 331/179, 17, 111; 328/111, 112, 34, 59–61; 307/235 K

[56] References Cited

U.S. PATENT DOCUMENTS 3,826,999  7/1974  Williford ........................ 331/179 X
3,914,712  10/1975  Currie ................................ 331/111

OTHER PUBLICATIONS

Jackson, "Analog Computation," (1960), pp. 47, 640.

Primary Examiner—Benedict V. Safourek
Assistant Examiner—Michael A. Masinick
Attorney, Agent, or Firm—Leonard R. Cool; Russell A. Cannon

[57] ABSTRACT

The square-wave output of a comparator is coupled back to the input of an RC controlled integrator including an operational amplifier and an inverter circuit with an output signal maintained at a predetermined level. The RC network sets the pulse repetition rate of the square wave. The inverter and integrator outputs are connected to separate inputs of the comparator. A gating circuit couples a data source to the operational amplifier. In particular, the gating circuit couples an additional square-wave current to the integrator via a resistor. The square-wave current may be in phase and raise the pulse repetition rate of the resulting square wave or out of phase and lower the pulse repetition rate.

2 Claims, 4 Drawing Figures

DIGITAL FREQUENCY SHIFT-KEYED TRANSMITTER

BACKGROUND OF THE INVENTION

1. Field of the Invention

This invention relates to a digital frequency generator or oscillator and in particular to a digital technique for shifting the frequency of the digital oscillator in accordance with the binary data to be transmitted.

2. Description of the Prior Art

Frequency shift keyed oscillators have been used for the transmission of binary information for many years. One complication is concerned with the communication of digital information in certain systems which require the conversion of the digital information to the audio-frequency range. As a result, numerous techniques have been developed for achieving this end. Generally, these techniques are concerned with converting two-level binary data into audio tones corresponding to the respective binary levels. Some of these techniques include switching between multiple oscillators; switched phase shift RC oscillators; voltage-controlled multivibrator oscillators; and variable reactance, phase shift RC oscillators among others. Because of stability requirements, the common approach was to use very stable temperature compensated LC oscillators. In this case, frequency shifting was achieved by switching in and out a second capacitor.

RC oscillators are not new, per se, but the circuits generally available do not have sufficient stability for applications with low bit rates in the voice-frequency band.

It is an object of the present invention to provide an improved frequency shift keyed oscillator which has very good frequency stability and which can be frequency shifted by an incoming binary data signal without producing undesirable transients.

SUMMARY OF THE INVENTION

In accordance with the present invention, a frequency shift keyed transmitter utilizes a digital frequency generator which has a pulse repetition rate established by the time constant of a first RC circuit as a part of an integrating means. The incoming data stream from a data source is applied to a gating circuit which feeds an additional square-wave current to the integrating means via a separate resistor. Depending on the state of this square-wave current, it will be either in phase or out of phase with the current through the first resistor and will raise or lower the frequency, respectively.

The frequency shift keyed transmitter comprising: a digital frequency generator comprising means for comparing a pair of input signals and providing a binary output signal in response thereto, means for inverting said binary output and supplying said inverted output signal at a predetermined level as a first input signal to said comparing means; and, means for integrating said binary output signal and supplying said integrated output signal as a second input signal to said comparing means; a source of binary data signals; means responsive to said binary data signals and to the output signal of said comparing means for controlling the output signal of said integrating means.

A digital frequency generator comprising: means for comparing a pair of input signal levels and providing a binary output; means for inverting said binary output and supplying said inverted output as a first input to said comparing means; and means for integrating said output and supplying said integrated output as a second input to said comparing means.

BRIEF DESCRIPTION OF THE DRAWINGS

The invention will be more clearly understood with reference to the following detailed specification read in conjunction with the drawings wherein.

DETAILED DESCRIPTION

Figure 1:
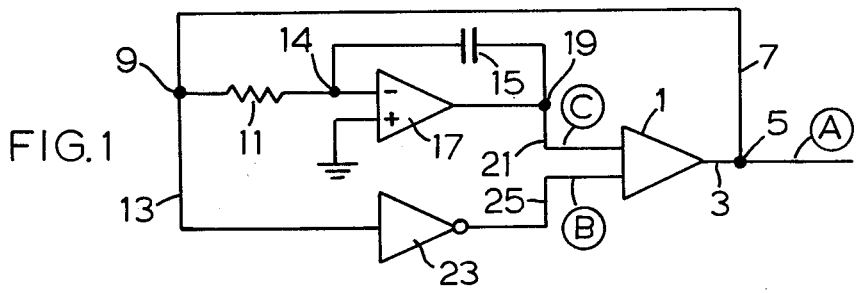
FIG. 1 is a block diagram of the basic frequency generator used to develop digitally the basic pulse repetition rate.
Figure 2:
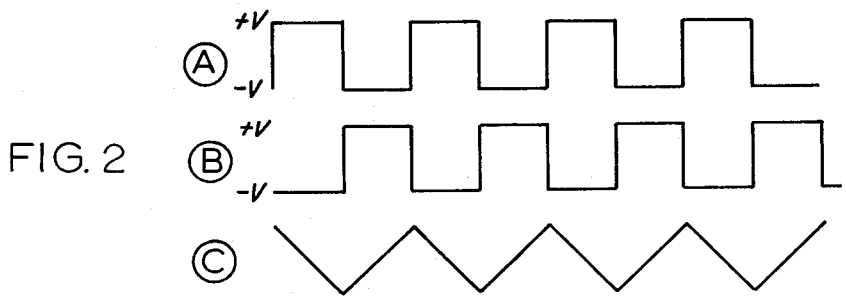
FIG. 2 is a series of waveforms showing the character of the wave in various portions of the circuit of FIG. 1.

Referring now to FIG. 1, comparator 1 provides a square-wave output signal at 3, which is coupled back via junction 5 and path 7 to junction 9 and the input to an integrator. The integrator consists of resistor 11 and capacitor 15, which capacitor is connected between the inverting input and the output of an operational amplifier 17. The noninverting input of the operational amplifier 17 is connected to a reference potential, which in this case shown as ground. The action of the integrating circuit is to generate at junction 19 a sawtooth waveform (see waveform C, FIG. 2) from square wave (waveform A, FIG. 2). From junction 9 the square-wave output signal from comparator 1 is coupled via path 13 to inverter 23 where it is then applied to a separate input of comparator 1 via path 25. The inverter 23 maintains its output signal at a predetermined level independent of its input signal level to thereby preclude frequency error at the comparator output due to a voltage error at said separate input of comparator 1. The waveform input from the inverter 23 is shown at B in FIG. 2.

The comparator may be an operational amplifier operated in a differential mode. If it is assumed that the comparator output signal (waveform A) has just gone to $+V$ (binary 1), there is a positive current flowing into the operational amplifier 17, so there is a constant current into the capacitor, and the output of the operational amplifier 17 will change at a constant voltage rate with time ($dV/dt = K$). The slope is constant and is moving from the $+V$ value to a negative as is shown at waveform C, FIG. 2. At the same time, the output of the inverter 23 is $-V$ (binary 0) so at this instant in time, the input to comparator 1 via path 21 from the integrating means is plus but decreasing, while that from the inverter 23 is minus and constant. When the value of the voltage input on path 21 decreases sufficiently, comparator 1 will change state so that the output will then go from binary 1 to binary 0. Then, capacitor C begins charging, and the rate of increase in voltage with time follows the path as shown at C in FIG. 2. At the time when the output of comparator 1 changes state, the output of inverter 23 immediately changes state, and thus the output on path 25 is binary 1. It is only when the output from the integrator on path 21 increases to a sufficiently positive value that the output of the comparator will again change state. This will continue so that the pulse repetition rate is effectively set by the RC time constant of resistor 11 and capacitor 15.

Figure 3:
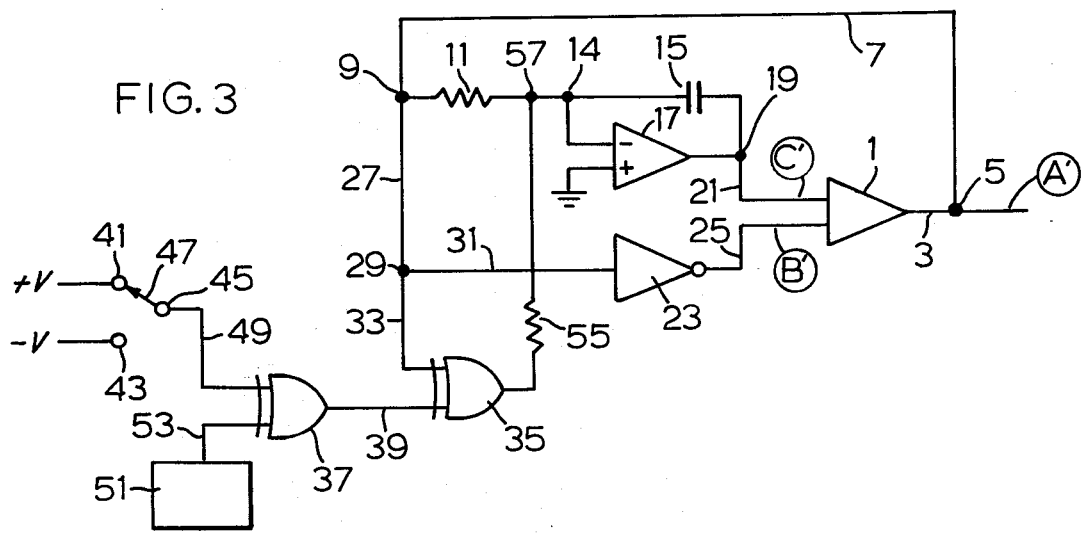
FIG. 3 is a block diagram of a frequency shift keyed transmitter developed using the digital frequency generator of FIG. 1.
Figure 4:
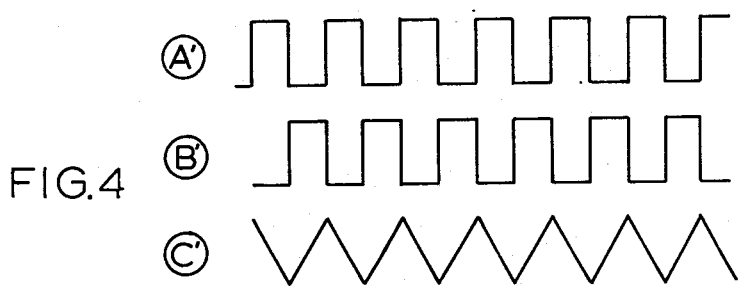
FIG. 4 includes a second set of waveforms which illustrate one effect of adding the square wave current to the integrator via the second resistor.

Referring now to FIG. 3, the frequency shift gating circuit to the basic oscillator shown in FIG. 1 is now discussed. Note that an Exclusive-OR gate 37 has an input on path 49 which can be connected either to a plus voltage or a negative voltage, depending upon the polarity which would represent binary 1 or binary 0 on path 39 from data source 51 via path 53 and Exclusive-OR gate 37. A second Exclusive-OR gate 35 has one input connected to the output of Exclusive-OR gate 37 and its second input connected to the output of comparator 1 via path 3, junction 5, path 7, junction 9, path 27, junction 29, and path 33. The output of Exclusive-OR gate 35 is applied to the RC network of the basic oscillator 11 and 15 via resistor 55 and junction 57. To more clearly understand the operation, assume that the connection via path 49 to Exclusive-OR gate 37 is made as shown from the +V (binary 1) position 41 through jumper 47 and junction 45. Next, assume that data source 51 is putting out a continuous series of binary 1's via path 53 to Exclusive-OR gate 37. In this case, the output would be zero and would be applied via path 39 to one input of Exclusive-OR gate 35. Whenever the output of comparator 1 is binary 1, then the output of Exclusive-OR gate 35 would also be binary 1, because it would have 10 inputs. This is in phase with the current supplied via the comparator 1, path 3, junction 5, path 7, junction 9, resistor 11, junction 14, and operational amplifier 17, noninverting input, and capacitor 15. The effect is to increase the frequency as is shown in FIG. 4. Operation is similar to that as hereinbefore described for FIG. 1, except that now there is an additional current being supplied to the integrating circuitry which is in phase with the normal oscillator current thereby increasing the frequency of oscillation of the circuit, changing it to reflect the state of the binary data from data source 51.

What is claimed is:

1. A frequency shift-keyed transmitter comprising:
    comparing means having a first input, a second input and an output;
    inverting means having an input connected to the output of said comparing means and an output connected to the first input of the comparing means;
    a first resistor having one end connected to the output of said comparing means;
    an operational amplifier having one input connected to the other end of said first resistor, and the other input connected to a bias potential, and an output connected to the second input of said comparing means;
    a capacitor having one end connected to said one input of the operational amplifier and the other end thereof connected to the output of said operational amplifier;
    a source of binary data signals;
    a second resistor having one end connected to said one input of the operational amplifier; and
    gating means connected between said data source and the other end of said second resistor.

2. A transmitter in accordance with claim 1 wherein said gating means further comprises:
    an Exclusive-OR circuit having one input connected to the output of the data source, a second input connected to the output of said comparing means and the output connected to the said other end of the second resistor.

* * * * *